(12) United States Patent
Leban

(10) Patent No.: US 6,887,596 B2
(45) Date of Patent: May 3, 2005

(54) PORTABLE DISPOSABLE FUEL-BATTERY UNIT FOR A FUEL CELL SYSTEM

(75) Inventor: Marzio Leban, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 376 days.

(21) Appl. No.: 10/056,176

(22) Filed: Jan. 22, 2002

(65) Prior Publication Data

US 2003/0138676 A1 Jul. 24, 2003

(51) Int. Cl.[7] .................... H01M 16/00; H01M 8/02
(52) U.S. Cl. .................. 429/9; 429/13; 429/34; 429/38; 320/101
(58) Field of Search ................. 429/9, 13, 34, 429/38; 320/101

(56) References Cited

U.S. PATENT DOCUMENTS

| | | |
|---|---|---|
| 3,450,500 A | 6/1969 | Setzer et al. |
| 4,493,878 A | 1/1985 | Horiba et al. |
| 5,432,023 A | 7/1995 | Yamada et al. |
| 5,504,471 A | 4/1996 | Lund |
| 5,644,342 A | 7/1997 | Argyres |
| 5,673,939 A | 10/1997 | Bees et al. |
| 5,789,093 A | 8/1998 | Malhi |
| 5,797,269 A | 8/1998 | Nishimura et al. |
| 5,812,156 A | 9/1998 | Bullock et al. |
| 5,962,155 A | 10/1999 | Kuranaka et al. |
| 5,976,725 A * | 11/1999 | Gamo et al. ............... 429/25 |
| 6,007,186 A | 12/1999 | Erni |
| 6,015,209 A | 1/2000 | Barinaga et al. |
| 6,039,430 A | 3/2000 | Helterline et al. |
| 6,054,228 A | 4/2000 | Cisar et al. |
| 6,089,687 A | 7/2000 | Helterline |
| 6,113,208 A | 9/2000 | Benjamin et al. |
| 6,129,861 A | 10/2000 | Meusinger et al. |
| 6,198,250 B1 | 3/2001 | Gartstein et al. ........... 320/112 |
| 6,268,077 B1 | 7/2001 | Kelly et al. ................ 429/33 |
| 6,294,276 B1 | 9/2001 | Ogino |
| 6,326,097 B1 | 12/2001 | Hockaday |
| 6,534,033 B1 | 3/2003 | Amendola |
| 6,713,201 B2 | 3/2004 | Bullock et al. |
| 6,724,194 B1 | 4/2004 | Barton |
| 2001/0052433 A1 * | 12/2001 | Harris et al. ............. 180/68.5 |
| 2002/0018925 A1 | 2/2002 | Celemin et al. |
| 2002/0127447 A1 | 9/2002 | Edlund et al. |
| 2003/0008186 A1 | 1/2003 | Dickman et al. |
| 2003/0022041 A1 | 1/2003 | Barton et al. |
| 2003/0022042 A1 | 1/2003 | Wells et al. |
| 2003/0082426 A1 | 5/2003 | Bullock et al. |
| 2003/0082427 A1 | 5/2003 | Prasad et al. |
| 2003/0124408 A1 | 7/2003 | Hojo et al. |
| 2003/0129464 A1 | 7/2003 | Becerra et al. |
| 2003/0136453 A1 | 7/2003 | Johnson |
| 2003/0138676 A1 | 7/2003 | Leban |
| 2003/0138679 A1 | 7/2003 | Prasad et al. |
| 2004/0009121 A1 | 1/2004 | Jensen et al. |
| 2004/0076861 A1 | 4/2004 | Mann et al. |

FOREIGN PATENT DOCUMENTS

| | | |
|---|---|---|
| GB | 2283235 A | 5/1995 |
| JP | 2001-185184 A | 7/2001 |
| JP | 2001-313047 A | 11/2001 |
| WO | WO-00/24076 A | 10/1998 |
| WO | WO02059993 | 8/2002 |
| WO | WO-03/043112 A | 5/2003 |

* cited by examiner

Primary Examiner—Hoa Van Le

(57) ABSTRACT

The present invention provides methods for providing a portable disposable fuel-battery unit, a portable disposable fuel-battery unit for a fuel cell system having at least one fuel cell, a fuel cell stack, and a handheld device having a fuel cell system with a portable disposable fuel-battery unit. In one embodiment, the portable disposable fuel-battery unit provides a fuel compartment, for providing fuel for the at least one fuel cell and a disposable power battery, affixed to the fuel compartment, for providing start-up energy for the at least one fuel cell.

25 Claims, 6 Drawing Sheets

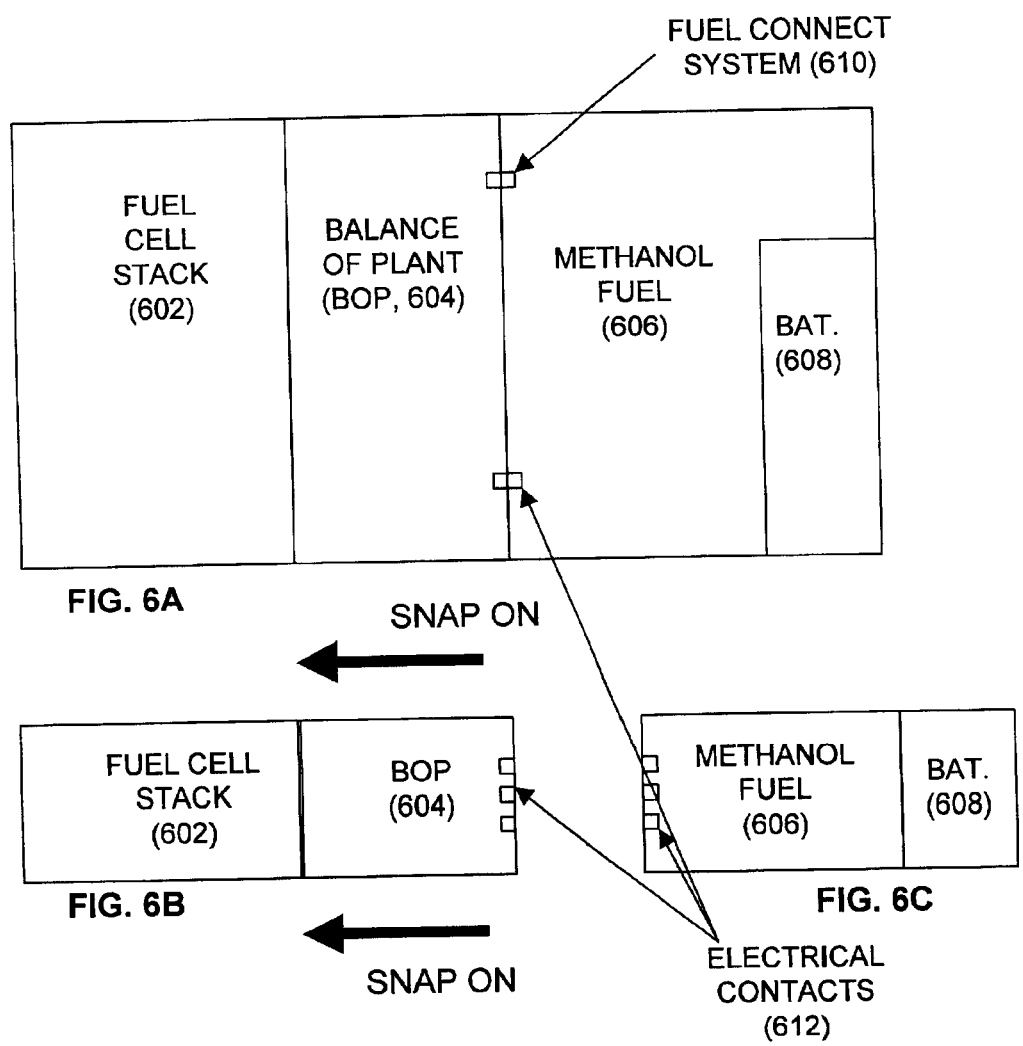

PORTABLE DISPOSABLE FUEL-BATTERY UNIT FOR A FUEL CELL SYSTEM

BACKGROUND OF THE INVENTION

The present invention relates to portable fuel cells and more particularly, to start-up of portable fuel cells. Fuel cells convert electrochemical energy into electricity, typically by catalyzing hydrogen to split off electrons, conducting the electrons through the anode to an external circuit and reacting the hydrogen ions with oxygen ions that have been formed when oxygen is catalyzed.

Traditionally, fuel cells have been used for stationary power, automotive power or for space program applications. Since a single fuel cell typically produces a relatively small amount of energy, the fuel cell system generally has a stack of cells and support systems called Balance of Plant (BOP). The BOP systems have power-consuming components such as heaters and blowers to supply pressure. In order to startup a portable fuel cell system, the system needs to be provided with power until the fuel cell generates enough power to satisfy the BOP system needs. During the startup time, the power may be provided by a battery attached to the fuel cell. Thus, similar to the automobile system in which a car battery is used to supply energy to start the engine and is charged when the engine is running, the fuel cell needs auxiliary power to startup.

Though electric cars have been developed that utilize a power battery with secondary cells connected to the motor and an energy battery formed by fuel cells connected in parallel to the power battery via an energy battery control switch, such a hybrid system requires that the user obtain and maintain the power battery in order to operate the electric car.

Portable fuel cells need to be small enough and have a small enough weight to enable an ordinary person to carry them easily. Hence, it would be useful to have a portable fuel cell system that frees the operator from having to obtain a power battery separately and having to maintain the power battery.

SUMMARY OF THE INVENTION

The present invention provides methods for providing a portable disposable fuel-battery unit, a portable disposable fuel-battery unit for a fuel cell stack having at least one fuel cell, a fuel cell stack, and a handheld device having a fuel cell stack with a portable disposable fuel-battery unit. In one embodiment, the portable disposable fuel-battery unit provides a fuel compartment, for providing fuel for the at least one fuel cell and a disposable power battery, affixed to the fuel compartment, for providing start-up energy for the at least one fuel cell.

BRIEF DESCRIPTION OF THE DRAWINGS

FIG. 6A is a block diagram of another embodiment of a fuel cell system with a portable disposable fuel-battery unit in accordance with the present invention; FIG. 6B is a side view of one embodiment of the fuel cell system; and FIG. 6C is a side view of one embodiment of the portable disposable fuel-battery unit.

DETAILED DESCRIPTION OF THE PREFERRED EMBODIMENTS

In the embodiments of the present invention, a fuel cell system is provided with a light-weight auxiliary power battery that is disposed in a compartment of a disposable fuel container. Where desired, the auxiliary power battery may be trickle-charged by the fuel cell stack after the fuel cell stack has been activated and generates sufficient energy to assure sufficient power in the fuel cells to operate as a battery and have excess power that may be used for the trickle charge. Upon exhaustion of the fuel supply, the portable fuel-battery unit is disposed of, allowing a new fuel-battery unit to be supplied with every fuel recharge. Hence, the startup battery need only provide a limited number of discharge-recharge cycles and may be implemented at a lower cost than using a battery that is separate from the disposable fuel container.

Typically, fuel such as hydrogen or methanol may be used.

Figure 1:
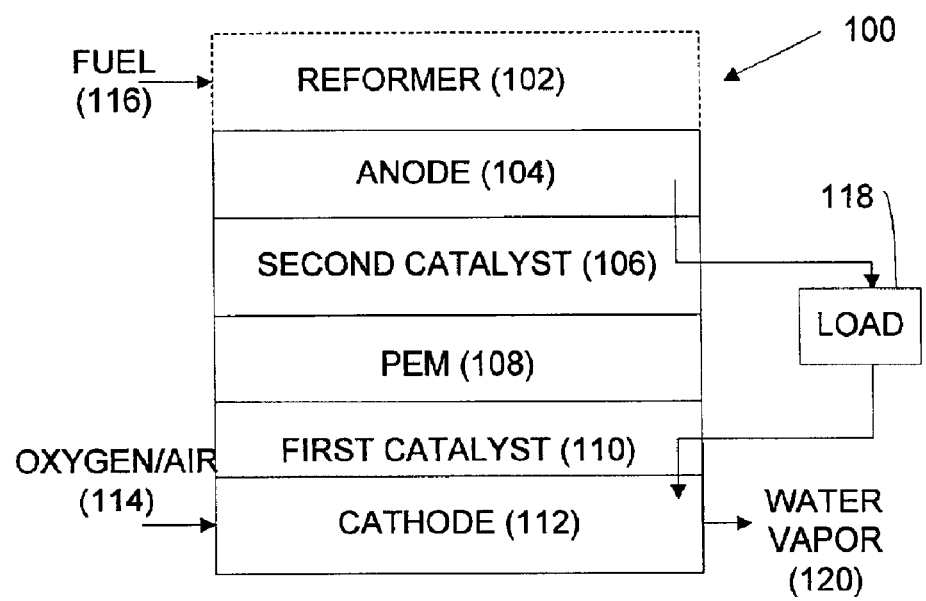
FIG. 1 is a block diagram of one embodiment of a fuel cell as is known in the art.

In one prior art embodiment, as shown in FIG. 1, the fuel cell 100 has an air or oxygen input 114 and a fuel input 116 for inputting fuel to the anode 104. Methanol or hydrogen, for example, may be utilized as a fuel for the fuel cell. In one embodiment, a reformer 102 may be coupled to the anode 104 to convert a fuel to hydrogen, which is then sent to the anode 104. Where hydrogen is used, the reformer 102 may be eliminated from the fuel cell 100.

In the embodiment shown in FIG. 1, the proton exchange medium (PEM) 108 separates the anode 104 and the cathode 112, with a first catalyst layer 110 lying between the cathode 112 and the PEM 108 and a second catalyst layer 106 lying between the anode 104 and the PEM 108. The PEM 108 blocks the electrons, so that the electrons split away from the hydrogen at the anode 104 flow through the anode 104 to an external electric load 118 Hydrogen ions formed at the anode pass through the PEM 108 and the first catalyst 110 where the hydrogen ions combine with oxygen ions and electrons that stream through the first catalyst 110 into the cathode 112 from the load 118, forming water or steam, which is released through a controlled outlet 120 of the cathode 112.

Figure 2:
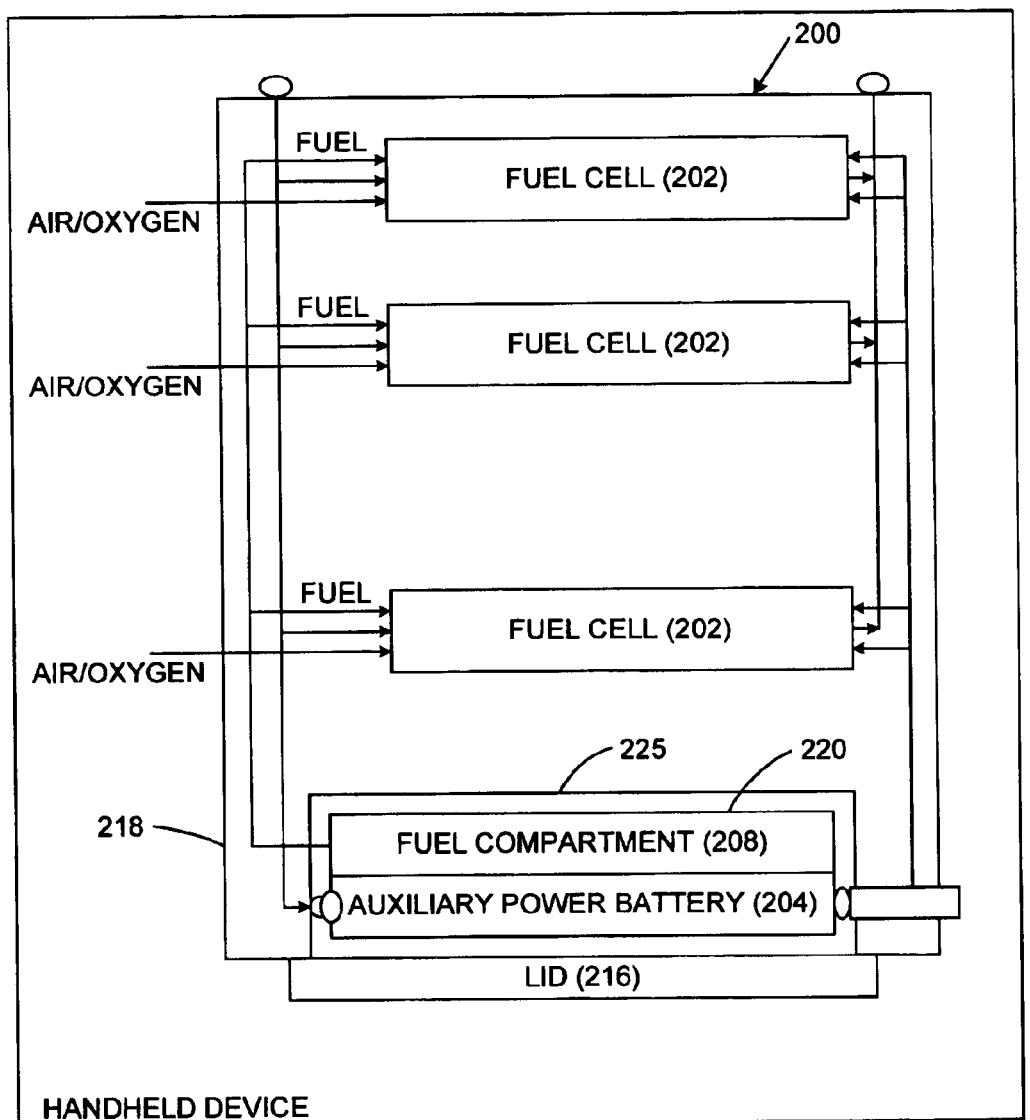
FIG. 2 is a block diagram of one embodiment of a fuel cell stack having a light-weight auxiliary power battery in a compartment of a disposable fuel container and a hand-held device utilizing the fuel cell battery in accordance with the present invention.

Typically, the reaction in a single fuel cell produces a low voltage output. To provide a larger voltage, generally a plurality of fuel cells are combined in series to form a fuel cell stack. To provide more current, generally a plurality of fuel cells are combined in parallel to form a fuel cell stack. To provide particular power requirements, a plurality of fuel cells are combined in a combination of series and parallel to form a fuel cell stack. As shown in FIG. 2, the present invention provides a fuel cell system 200 having a plurality of fuel cells 202 that form a fuel cell stack that is coupled to a disposable fuel-battery unit 220 wherein a disposable light-weight auxiliary power battery 204 is disposed in a compartment of the fuel-battery unit 220. For example, a plurality of fuel cells similar to the fuel cell 100 shown in FIG. 1 may be stacked to form the fuel cell stack. The disposable fuel-battery unit 220 has a compartment 208 for fuel such as, for example, hydrogen, and another compartment for the auxiliary power battery 204.

The stack of the plurality of fuel cells 202 are generally coupled in series and/or parallel as required. Typically, the fuel cell system 200 is disposed in a shell 218 that has a lid 216, for example, a lid with a snapable fastener (not shown). The lid 216 provides access to a chamber 225 in the shell 218 proximate to the stack of fuel cells 202. The lid 216 provides access to the chamber 225 in the fuel cell system 200 wherein the portable disposable fuel-battery unit 220 may be inserted. The function of the auxiliary power battery 204 is to: 1) provide start-up power for the Balance of Plant components, not shown for simplicity, 2) to provide back-up power for transient demands where the fuel cell system 200 cannot respond quickly enough, and 3) to provide instant power while the fuel cell stack is powering up.

A hand-held device 240 may be powered by the fuel cell system 200. Thus, FIG. 2 is a block diagram of one embodiment of a fuel cell system 200 having an auxiliary power battery 204 in a compartment of a disposable fuel container having a fuel compartment 208 and a hand-held device 240 utilizing the fuel cell system in accordance with the present invention.

Figure 3:
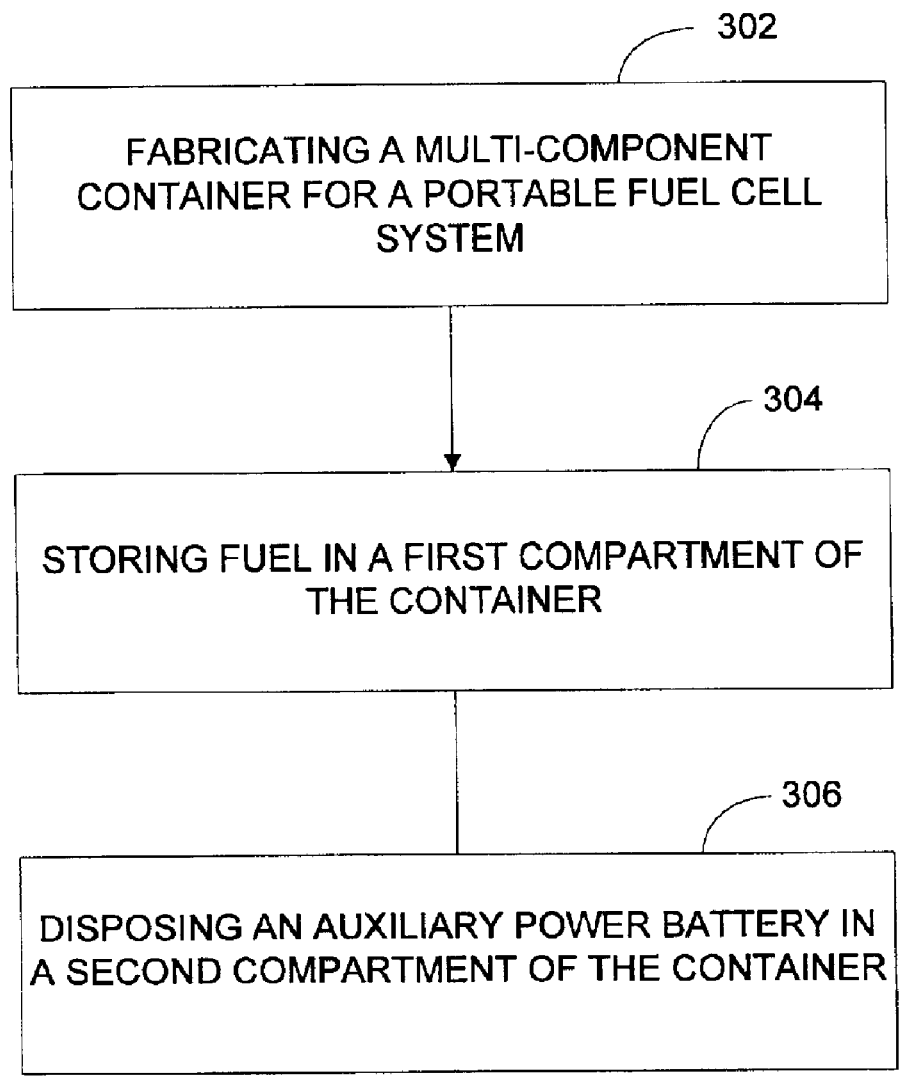
FIG. 3 is a flow chart of one embodiment of steps for a method in accordance with the present invention.

FIG. 3 is a flow chart of one embodiment of steps for a method in accordance with the present invention. The method provides for coalescing a startup energy unit with a fuel source for a portable fuel cell battery. In one embodiment, the steps of the method include fabricating 302 a multi-compartment container for a portable fuel cell battery, storing 304 fuel in a first compartment of the container, and disposing 306 a light-weight auxiliary power battery in a second compartment of the container. For example, the fuel may be hydrogen or methanol. Where desired, when the portable fuel cell battery has been activated and produced sufficient energy, the portable fuel cell stack may be used as an energy source for a trickle charge to the disposable battery.

Figure 4:
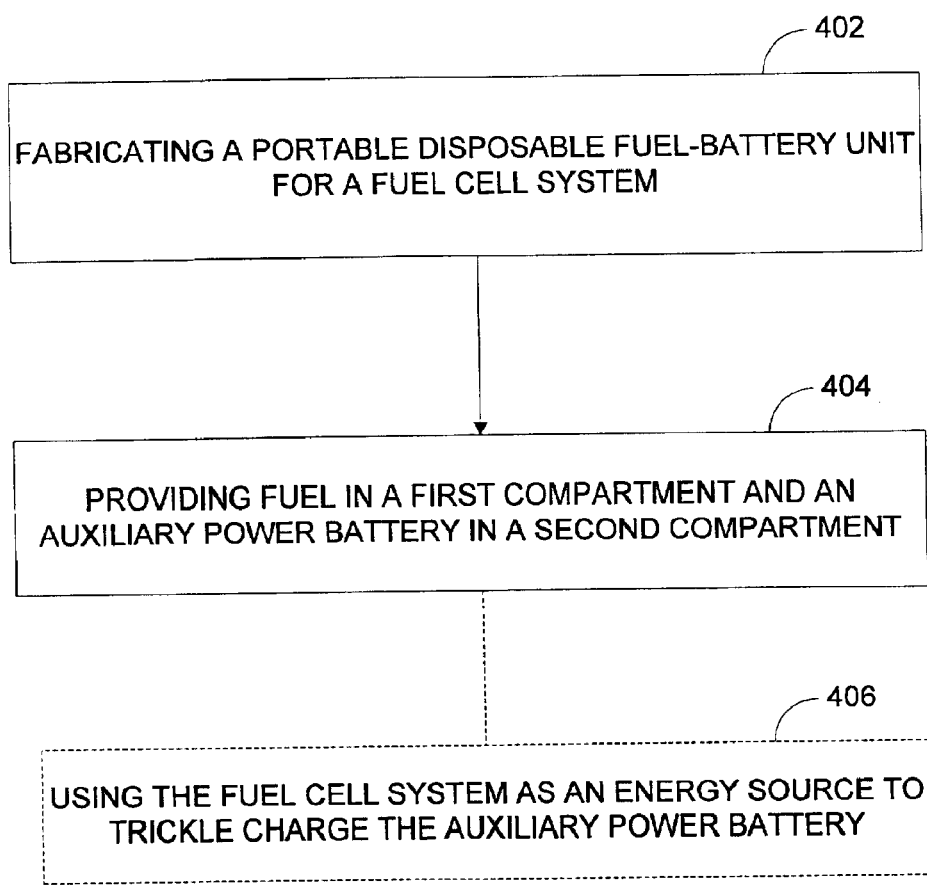
FIG. 4 is a flow chart of another embodiment of steps for a method in accordance with the present invention.

FIG. 4 is a flow chart of another embodiment of steps for a method in accordance with the present invention. The method may fabricate a portable disposable fuel-battery unit for a fuel cell battery such that the portable disposable fuel-battery unit simultaneously provides startup energy and fuel for the fuel cell battery. In the embodiment of FIG. 4, the method includes the steps of fabricating 402 a disposable multi-compartment container for a portable disposable fuel-battery unit and providing 404 fuel in a first compartment and a light-weight auxiliary power battery in a second compartment of the multi-compartment container. Typical fuels may be hydrogen or methanol, for example. As described above, where desired, the fuel-cell stack, upon activation to provide a sufficient energy, may be used 406 as an energy source for a trickle charge to the disposable battery. In one embodiment, the fuel cell battery comprises a plurality of stacked fuel cells.

Figure 5:
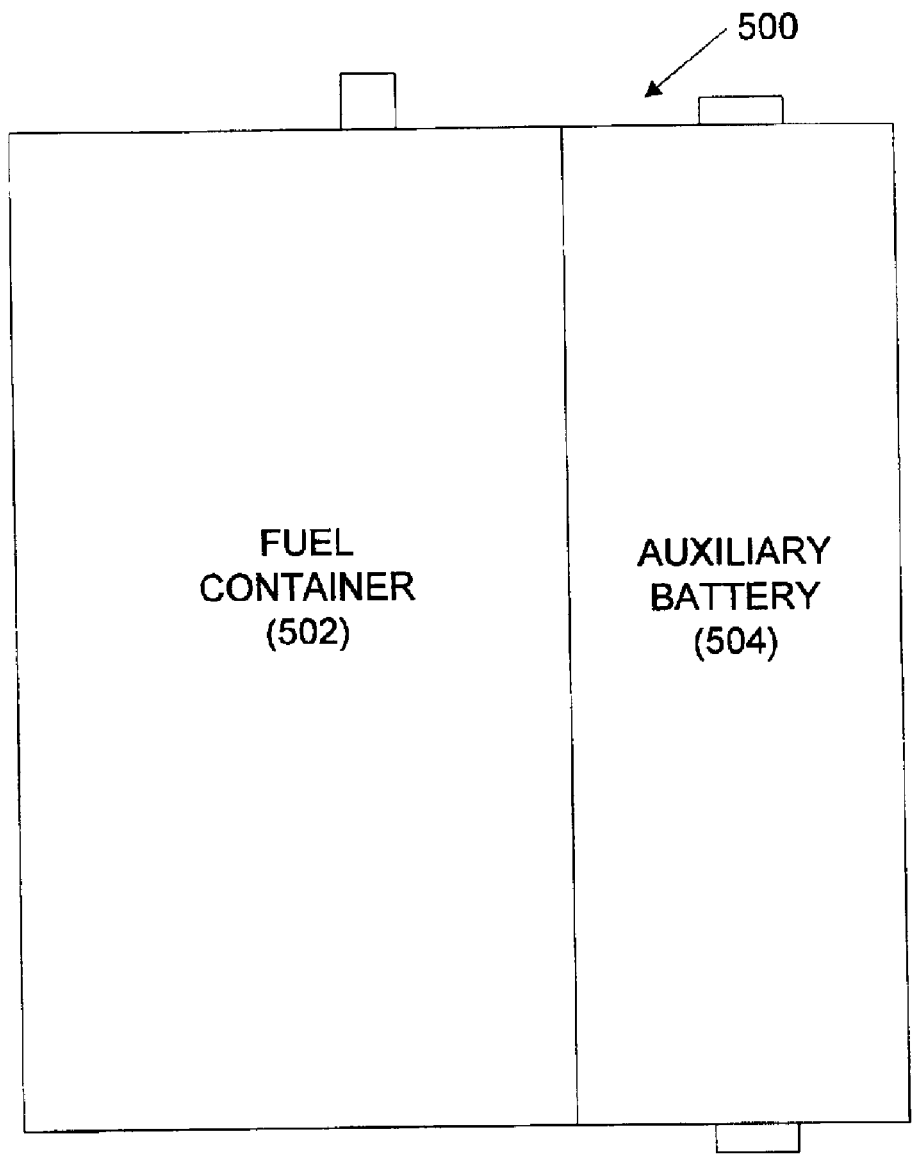
FIG. 5 is a block diagram of one embodiment of a portable disposable fuel-battery unit in accordance with the present invention.

FIG. 5 is a block diagram of one embodiment of a portable disposable fuel-battery unit in accordance with the present invention. The battery-enabled disposable fuel container is used to provide startup energy for a fuel cell battery. Generally, the portable disposable fuel-battery unit 500 includes a fuel container 502 for the fuel cell stack (not shown) wherein the fuel container has an auxiliary battery 504 attached thereto. Again, fuels may be, for example, hydrogen or methanol. Where desired, as described above, the fuel cell battery may provide a trickle charge to the auxiliary battery 504 of the battery-enabled disposable fuel container 500. As shown in FIG. 2, the battery-enabled disposable fuel container may include a circuitry for receiving a trickle-charge from the fuel cell stack. In addition, the battery-enabled disposable fuel container may include a fuel connect system to stacked fuel cells 202 in the fuel cell stack.

FIG. 6A is a block diagram of another embodiment of a fuel cell with a portable disposable fuel-battery unit in accordance with the present invention. FIG. 6B is a side view of one embodiment of the fuel cell, and FIG. 6C is a side view of one embodiment of the portable disposable fuel-battery unit. The exemplary fuel cell includes a fuel cell stack 602 coupled to a Balance of Plant (BOP) 604 as is known in the art. The portable disposable fuel-battery unit includes a compartment for methanol fuel 606 and an auxiliary battery (BAT.) 608. The portable disposable fuel-battery unit (FIG. 6C) snaps together with the fuel cell (FIG. 6B) with a fuel connect system 610 connecting the compartment with the methanol fuel 606 and a series of electrical contacts 612 connecting the portable disposable fuel-battery unit with an electrical system of the BOP 604 (not shown). Fuel cell stacks are known to those skilled in the art and will not be discussed further herein. In the embodiment shown in FIG. 6, a direct methanol fuel cell is utilized. However, other types of fuel cells may be utilized. For example, a hydrogen fuel cell may be used. As is known to those skilled in the art, the Balance of Plant 604 includes means to mix and deliver fuel to the stack in addition to providing for water and carbon dioxide exhaust. The portable disposable fuel-battery unit includes a methanol fuel compartment 606 and a secondary battery 608 that is renewed with each new fuel charge by simply being replaced. The compartment containing methanol fuel 606 for the portable disposable fuel-battery unit snaps onto the fuel cell in a manner that facilitates fuel and electrical connections. Though only one embodiment of such a connection is shown, many other suitable connections may be used and are understood to be a part of the present invention. Where desired, the secondary battery (BAT.) 608 may be trickle charged when the fuel cell is operating, prolonging the life of the secondary battery.

Thus, methods for providing a portable disposable fuel-battery unit, a portable disposable fuel-battery unit for a fuel cell battery having at least one fuel cell, a fuel cell stack, and a handheld device having a fuel cell stack with a portable disposable fuel-battery unit have been described according to the present invention. Many modifications and variations may be made to the techniques and structures described and illustrated herein without departing from the spirit and scope of the invention. Accordingly, it should be understood that the methods for providing a portable disposable fuel-battery unit, a portable disposable fuel-battery unit for a fuel cell stack having at least one fuel cell, a fuel cell stack, and a handheld device having a fuel cell stack with a portable disposable fuel-battery unit described herein are illustrative only and are not limiting upon the scope of the invention.

What is claimed is:

1. A portable disposable fuel-battery unit for use with a system including a fuel cell, a system fuel connector operably connected to the fuel cell, and a system electrical connector, the portable disposable fuel-battery unit comprising:

a fuel-battery container including a fuel compartment having fuel stored therein and a battery compartment having a battery stored therein;

a fuel-battery unit fuel connector, operably connected to the fuel compartment, adapted to be connected to the system fuel connector such that fuel can flow out of the fuel-battery container; and a fuel-battery unit electrical connector, operably connected to the battery, adapted to be connected to the system electrical connector.

2. A portable disposable fuel-battery unit as claimed in claim 1, wherein the fuel comprises hydrogen.

3. A portable disposable fuel-battery unit as claimed in claim 1, wherein the fuel comprises methanol.

4. A portable disposable fuel-battery unit as claimed in claim 1, wherein the fuel-battery container includes only a fuel compartment and a battery compartment.

5. An apparatus, comprising:
   a fuel cell system including
      at least one fuel cell,
      a system fuel connector operably connected to the fuel cell, and
      a system electrical connector; and
   a portable disposable fuel-battery unit including
      a fuel-battery container including a fuel compartment having fuel stored therein and a battery compartment having a battery stored therein,
      a fuel-battery unit fuel connector, operably connected to the fuel compartment, adapted to be connected to the system fuel connector such that fuel can flow out of the fuel-battery container to the at least one fuel cell, and
      a fuel-battery unit electrical connector, operably connected to the battery, adapted to be connected to the system electrical connector.

6. An apparatus as claimed in claim 5, wherein the fuel comprises hydrogen.

7. An apparatus as claimed in claim 5, wherein the fuel comprises methanol.

8. An apparatus as claimed in claim 5, wherein the fuel-battery container includes only a fuel compartment and a battery compartment.

9. An apparatus as claimed in claim 5, wherein the fuel cell system includes a plurality of fuel cells.

10. An apparatus as claimed in claim 5, wherein the fuel cell system includes an outer shell defining a chamber, the fuel-battery container is located within the chamber and the at least one fuel cell is not located within the chamber.

11. An apparatus as claimed in claim 5, wherein the fuel-battery container and fuel cell system are adapted to be snap-connected to one another.

12. A device, comprising:
   an electrical load;
   a fuel cell system including
      at least one fuel cell connected to the electrical load,
      a system fuel connector operably connected to the fuel cell, and
      a system electrical connector; and
   a portable disposable fuel-battery unit including
      a fuel-battery container including a fuel compartment having fuel stored therein and a battery compartment having a battery stored therein,
      a fuel-battery unit fuel connector, operably connected to the fuel compartment, adapted to be connected to the system fuel connector such that fuel can flow out of the fuel-battery container to the at least one fuel cell, and
      a fuel-battery unit electrical connector, operably connected to the battery, adapted to be connected to the electrical load.

13. A device as claimed in claim 12, wherein the fuel comprises hydrogen.

14. A device as claimed in claim 12, wherein the fuel comprises methanol.

15. A device as claimed in claim 12, wherein the fuel-battery container includes only a fuel compartment and a battery compartment.

16. A device as claimed in claim 12, wherein the fuel cell system includes a plurality of fuel cells.

17. A device as claimed in claim 12, wherein the fuel cell system includes an outer shell defining a chamber, the fuel-battery container is located within the chamber and the at least one fuel cell is not located within the chamber.

18. A device as claimed in claim 12, wherein the fuel-battery container and fuel cell system are adapted to be snap-connected to one another.

19. A method of fueling an apparatus that includes a fuel cell and an electrical load connected to the fuel cell, the method comprising the steps of:
   connecting a single fuel-battery cartridge that includes both fuel and a battery to the fuel cell and to the electrical load;
   supplying power to the electrical load with the battery; and
   transferring fuel from the fuel-battery cartridge to the fuel cell.

20. A method as claimed in claim 19, wherein the fuel comprises hydrogen.

21. A method as claimed in claim 19, wherein the fuel comprises methanol.

22. A method as claimed in claim 19, comprising the step of:
   charging the battery with energy from the fuel cell.

23. A portable disposable fuel-battery unit for use with a system including a fuel cell, a system fuel connector operably connected to the fuel cell, and a system electrical connector, the portable disposable fuel-battery unit comprising:
   a fuel container including a fuel compartment having fuel stored therein;
   a battery carried by the fuel container;
   a fuel-battery unit fuel connector, operably connected to the fuel compartment, adapted to be connected to the system fuel connector such that fuel can flow out of the fuel container; and
   a fuel-battery unit electrical connector, operably connected to the battery, adapted to be connected to the system electrical connector.

24. A portable disposable fuel-battery unit as claimed in claim 23, wherein the fuel comprises hydrogen.

25. A portable disposable fuel-battery unit as claimed in claim 23, wherein the fuel comprises methanol.

* * * * *